Aug. 28, 1962    A. W. GOOS ETAL    3,051,454

MIXING APPARATUS

Filed Dec. 11, 1959

INVENTORS.
Arthur W. Goos
BY Maurice A. Trepanier

ATTORNEY

United States Patent Office 3,051,454
Patented Aug. 28, 1962

3,051,454
MIXING APPARATUS
Arthur W. Goos and Maurice A. Trepanier, Marquette, Mich., assignors to The Dow Chemical Company, Midland, Mich., a corporation of Delaware
Filed Dec. 11, 1959, Ser. No. 858,981
5 Claims. (Cl. 259—6)

This invention relates to a mixing apparatus. More particularly it pertains to an apparatus for intermixing a solid in particulate form with a fluid to form a moldable product.

An object of this invention is to provide an apparatus for mixing fluids or liquids with a solid in particulate form in a continuous manner. A further object is to provide a mixer which will require a relatively low power input per ton of material mixed and in which the mixing may be rapidly accomplished.

The mixing apparatus herein provided may be continuously operated, mixing fluids, such as liquids or pastes, with solids at relatively low power input. The mixing is accomplished rapidly so that a mixer of about 2½ feet in diameter is capable of producing 8 tons per hour of a wet mixture.

The invention itself, as to the objects and advantages and mode of operation, may be better understood by referring to the following description taken in connection with the drawing, in which.

Figure 1:
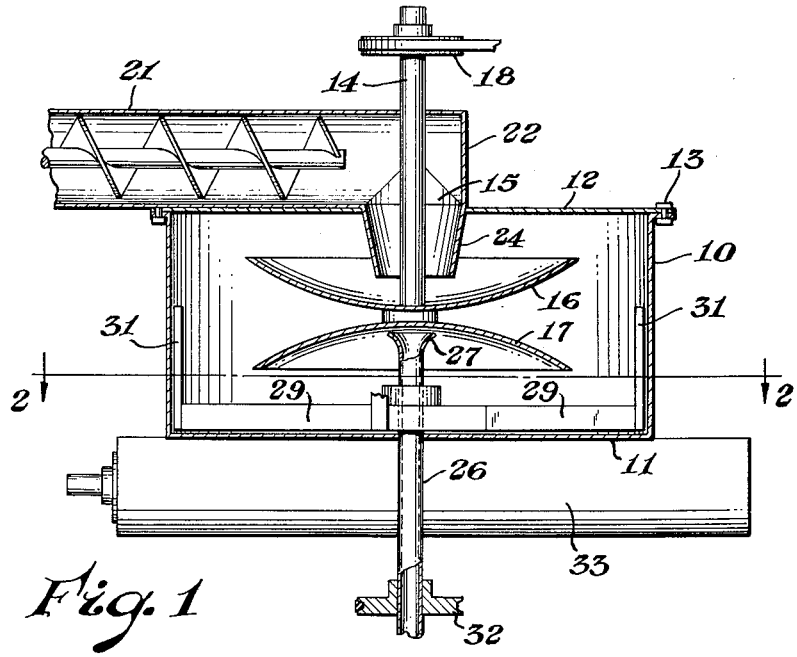
FIGURE 1 is a cross sectional view of an embodiment of the invention.

The apparatus shown has a cylindrical housing 10 which has a bottom 11 and a cover 12 attached to housing 10 by means of a multiplicity of bolts 13. A shaft 14 rotatably mounted extends axially into cylindrical housing 10 through an opening 15 in the cover plate. A pair of dished disks 16 and 17, respectively, are mounted on the rotatable shaft one above the other. The concave side of the top disk 16 faces upwardly, while the concave side of the bottom disk 17 faces downwardly. A pulley 18 is shown attached to shaft 14. It is used as a means for rotating the shaft and the two disks attached to the shaft. While a pulley is shown, the shaft may be coupled to a motor directly or other various known means to rotate a shaft used.

A screw conveyor 21 discharging from a bin or hopper (not shown) is used as a means of charging solids into the mixing apparatus. The screw conveyor is disposed on top of the cylindrical housing above the cover plate and extends from one side radially past the center of the cylindrical housing. The end of the screw conveyor is closed by plate 22. However, an outlet at the bottom of the conveyor housing is provided which corresponds to the opening 15 in cover plate 12 which is substantially larger than shaft 14. An inwardly sloping wall tubular member 24 extends inwardly from the opening 15 directing any solids which may be forced by screw conveyor 21 to fall near the center of the concave side of the top disk 16.

For the introduction of the fluid, a tubular shaft 26 is provided which extends axially up into the cylindrical housing from the bottom and terminates a short distance from the concave side of disk 17. As shown, the tubular shaft at the end 27 is flared to facilitate the transfer of the liquid from shaft 26 to the underside of disk 17. Shaft 26 is rotatably mounted in the cylindrical housing. A number of scraper arms 29, some having scraper blades 31 at the end, are attached to shaft 26. A pulley 32 attached to shaft 26 is shown as a means of rotating the shaft, although as pointed out above various other known means may be used. Scraper blades 31 are positioned adjacent to the vertical walls of cylindrical housing 10 and as shaft 26 is rotated the scrapers will remove the majority of mixture which may adhere to the walls.

Figure 2:
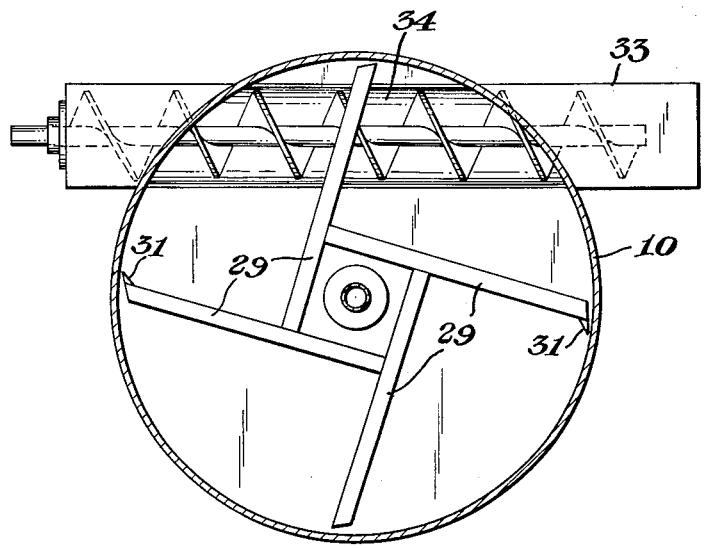
FIGURE 2 is a horizontal section on the line 2—2 of FIGURE 1.

The mixed material is removed from the cylindrical housing by use of a screw conveyor 33 located beneath the cylindrical housing. This may be more clearly seen FIGURE 2. In FIGURE 2, an opening 34 in the bottom of the housing communicates with the screw conveyor through which the mixture drops into the conveyor and is carried away. The scraper blades and arms move the wet mixture to opening 34 as they rotate.

In the operation of the apparatus, shaft 14 with disk 16 and 17 are rotated at relatively high speeds. The solid material in granular or powdered form which is to be intermixed with viscous fluid is introduced into the center of the concave side of the top of disk 16 by means of screw conveyor 21 which forces the solid to fall onto disk 16 through the inwardly tapered tubular member 24. The liquid is introduced through tubular shaft 26. Shaft 26 is also rotated, however at a much slower rate. The rotation of pipe 26 moves the radial scraper arms and scrapers within the housing. Since the disks 16 and 17 are being rotated at relatively high speeds the solids landing in the concave side of plate 16 are thrown from the plate by the centrifugal motion forming a continuously descending cloud of particles inside housing 10. The particles move downwardly under action of gravity. The liquid being introduced on the underside of disk 17 spreads out as a film over the concave surface of the disk and is atomized as it leaves the rim. The droplets travel out nearly horizontally until they strike the descending particles of solids. As a result of the liquid striking the dispersed solid, mixing is obtained. By the rotation of the radial arms 29, the mixture in the mixer is moved towards the opening 34 in the bottom and thus drops into the screw conveyor located at the bottom of the apparatus and transported to the desired place. Generally an extrusion section is provided in the screw conveyor so that the mixture remaining in this section provides a dust seal. Scraper blades 31 attached to radial arms 29 move around the inner periphery of the cylindrical housing and remove any solid materials which may adhere to the walls.

Disk 16 should be sufficiently dished and with a great enough diameter and rotational speed to give a well dispersed cloud of particles. Disk 17 should also be sufficiently dished to have the liquid adhere to the underside of the disk until it is thrown off at the outer rim at a high enough rotational speed to give good atomization of the liquid. The disks as shown are of the same size and curvature. Under certain conditions it may be desirable to use different size and shaped disks to obtain optimum mixing, depending upon the physical properties of each of the ingredients being mixed.

It is apparent that the apparatus shown in the attached figures may be modified without departing from the invention. Various known methods for discharging the solids onto disk 16 instead of a screw conveyor may be used. The solids if desired may be introduced by means of gravity only. Also various other known means may be used for discharging the mixed product from the cylindrical housing. Likewise it is not necessary to drive the scraper arms from tubular shaft 26. Separate means may be used to rotate the scraper arms and scrapers.

To further illustrate the invention, an apparatus similar to that shown in the attached drawing was used to intermix charcoal with starch paste. The cylindrical housing was approximately 30 inches in diameter and both of the dishshaped disks were 16 inches in diameter. The disks were dished to the extent that the radius of curvature was equal to the diameter of the disk. The charcoal was fed into the concave side of the disk by use of a screw conveyor 9 inches in diameter at a rate of 4.8 tons per hour. The starch paste at 85° C. was pumped through a rotating tubular shaft having a 1½-inch inside diameter at a rate of 12 gallons per minute onto the underside of the bottom disk. The disks were rotated at 1200 r.p.m. and the tubular shaft carrying the hot starch paste was rotated at 90 r.p.m. The scraper arms and scrapers were driven from the tubular shaft. A mixed product of approximately 8 tons per hour was continuously obtained.

The approximate horsepower used by the machine was as follows:

|  | Horsepower |
|---|---|
| Charcoal feed screw conveyor | 0.8 |
| Disks | 2.0 |
| Sweeps | 1.0 |
| Discharge screw | 0.7 |
| Total | 4.5 |

What is claimed is:

1. A mixing apparatus for intermixing solids in particulate form with fluids to form moldable products comprising a vertically disposed cylindrical housing having a top and bottom, a shaft rotatably mounted extending axially into said cylindrical housing from the top, a pair of dished disks mounted in said housing on said shaft one above the other with the concave side of the top disk facing upwardly and the concave side of the bottom disk facing downwardly, means to rotate the shaft, means to discharge the solid material into the concave side of the top disk, means to discharge the viscous fluid up into the concave side of the bottom disk, a rotatable scraper positioned adjacent to the vertical wall of said cylindrical housing, means to rotate said scraper, and means for removing the mixed product from said apparatus.

2. A mixing apparatus of claim 1 wherein the means for discharging the solid into the concave side of the top disk comprises a screw conveyor disposed on the top of said cylindrical housing, said screw conveyor having a discharge outlet at the bottom corresponding to an opening in the center of the top of the cylindrical housing, and means of operating the screw conveyor to thereby discharge the solids into the concave side of the top disk.

3. A mixing apparatus of claim 2 wherein the means for discharging the fluid up into the concave side of the bottom disk comprises a pipe extending axially through the bottom into the cylindrical housing, said pipe terminating a short distance from the center of the bottom of the dish-shaped disk at the concave side.

4. A mixing apparatus for intermixing a particulate solid with a fluid to form a moldable product comprising a vertically disposed cylindrical housing having a top and bottom, said top having an inwardly tapered tubular member extending into the cylindrical housing through an opening at the center of the top of the housing, said bottom having an outlet to thereby discharge the mixed product, a shaft rotatably mounted extending axially into said cylindrical housing from the top, means to rotate said shaft, a pair of dished disks mounted in said housing on said shaft one above the other with the concave side of the top disk facing upwardly and the concave side of the bottom disk facing downwardly, a screw conveyor horizontally disposed on top of said cylindrical housing, said screw conveyor having a discharge outlet located at the bottom and communicating with the inwardly tapered tubular member extending into the cylindrical housing through the opening at the top, means to rotate the screw in the screw conveyor to thereby discharge solids in the inwardly tapered tubular member into the concave side of the top disk, a tubular shaft rotatably mounted extending into said cylindrical housing axially from the bottom, said tubular shaft being disposed to discharge up into the center of the concave side of the bottom disk, a multiplicity of scraper arms extending radially from said tubular shaft, said scraper arms being attached to said tubular shaft, a multiplicity of scrapers attached to said scraper arms, said scrapers being positioned adjacent to the wall of the cylindrical housing, means to rotate said tubular shaft and scrapers, and means to discharge the mixed product through the opening in the bottom of the cylindrical housing.

5. A mixing apparatus comprising a vertically disposed cylindrical housing having a top and bottom, said top having an inwardly tapered tubular member extending into the cylindrical housing through an opening at the center of the top of the housing, said bottom having an outlet to thereby discharge the mixed product, a shaft rotatably mounted extending axially into said cylindrical housing from the top, means to rotate said shaft, a top dished disk mounted in said housing on said shaft with the concave side of the top disk facing upwardly, a screw conveyor horizontally disposed on top of said cylindrical housing, said screw conveyor having a discharge outlet located at the bottom and communicating with the inwardly tapered tubular member extending into the cylindrical housing through the opening at the top, means to rotate the screw in the screw conveyor to thereby discharge solids into the inwardly tapered tubular member into the concave side of the top disk, a tubular shaft rotatably mounted extending into said cylindrical housing axially from the bottom, a bottom dish-shaped disk mounted on the end of the first-mentioned shaft with the convex side of the bottom disk being contiguous to the convex side of the top dished disk, means to rotate said tubular shaft, means to discharge fluid from said tubular shaft onto the downwardly facing concave side of the bottom disk, a multiplicity of scraper arms rotatably mounted and extending radially in said cylindrical housing, a multiplicity of scrapers attached to said scraper arms, said scrapers being positioned adjacent to the wall of the cylindrical housing, and means to rotate said scraper arms and scrapers, to discharge the mixed product through the opening in the bottom of the cylindrical housing.

References Cited in the file of this patent

UNITED STATES PATENTS

| 1,131,260 | Nydegger | Mar. 9, 1915 |
| 1,191,673 | Davis | July 18, 1916 |
| 1,607,345 | Harding et al. | Nov. 16, 1926 |
| 1,658,938 | Owens | Feb. 14, 1928 |
| 1,855,548 | Forster | Apr. 26, 1932 |
| 2,592,709 | Kinnaird | Apr. 15, 1952 |
| 2,639,901 | Teale | May 26, 1953 |
| 2,862,511 | Forsberg | Dec. 2, 1958 |
| 2,946,574 | Munderich | July 26, 1960 |
| 2,953,359 | Mau | Sept. 20, 1960 |

FOREIGN PATENTS

| 812,908 | Germany | Sept. 6, 1951 |
| 342,064 | Great Britain | Jan. 29, 1931 |

UNITED STATES PATENT OFFICE
CERTIFICATE OF CORRECTION

Patent No. 3,051,454                  August 28, 1962

Arthur W. Goos et al.

It is hereby certified that error appears in the above numbered patent requiring correction and that the said Letters Patent should read as corrected below.

In the grant, lines 2 and 3, for "assignors to The Dow Chemical Company, of Midland, Michigan, a corporation of Delaware," read -- assignors to Cliffs Dow Chemical Company, of Marquette, Michigan, a corporation of Michigan --; line 12, for "The Dow Chemical Company, its successors" read -- Cliffs Dow Chemical Company, its successors --; in the heading to the printed specification, lines 4 and 5, for "assignors to The Dow Chemical Company, Midland, Mich., a corporation of Delaware" read -- assignors to Cliffs Dow Chemical Company, Marquette, Mich., a corporation of Michigan --.

Signed and sealed this 26th day of March 1963.

(SEAL)
Attest:

ESTON G. JOHNSON
Attesting Officer

DAVID L. LADD
                              Commissioner of Patents